May 28, 1968  R. A. CHEVALAZ  3,385,477
DIAPHRAGM FOR EXPELLING LIQUIDS FROM ANNULAR TANK
Filed Nov. 25, 1966  2 Sheets-Sheet 1

INVENTOR.
ROGER A. CHEVALAZ
BY
Curtis, Morris + Safford
ATTORNEYS

May 28, 1968  R. A. CHEVALAZ  3,385,477
DIAPHRAGM FOR EXPELLING LIQUIDS FROM ANNULAR TANK
Filed Nov. 25, 1966  2 Sheets-Sheet 2

INVENTOR.
ROGER A. CHEVALAZ
BY
Curtis, Morris & Safford
ATTORNEYS

United States Patent Office 3,385,477
Patented May 28, 1968

3,385,477
DIAPHRAGM FOR EXPELLING LIQUIDS
FROM ANNULAR TANK
Roger A. Chevalaz, Rockaway, N.J., assignor to Thiokol
Chemical Corporation, Bristol, Pa.
Filed Nov. 25, 1966, Ser. No. 596,853
9 Claims. (Cl. 222—136)

ABSTRACT OF THE DISCLOSURE

This disclosure is directed to an apparatus for expelling liquid from an annular tank having a convex casing with a diaphragm at its base and formed with concentric corrugations having a surface area equal to the surface area of the convex tank when expanded by a motive fluid and with circular wires connected to the corrugations to control its movement during expansion. In the illustrated construction the tank is in the form of a torus with a pair of medially located corrugated diaphragms arranged back to back for expelling bi-propellant liquids from opposite tanks to the combustion chamber of a rocket engine.

The present invention relates to liquid storage tanks and more particularly to improvements in diaphragm constructions for positively expelling liquid from such tanks.

While the present invention may have other applications, it is particularly adapted for use in rocket engines where equal volumes of a bi-propellant are to be fed to a combustion chamber. Expelling systems for rocket engines using bi-propellants in separate tanks have been heretofore proposed and have actual or pneumatic pistons to positively expel the separate propellant liquids therefrom. Flexing diaphragms also have been used for positively expelling liquids from tanks. Such prior constructions have presented difficult design problems, especially in rocket engines, because of leakage during storage and shifting of the center of gravity of the tank as the liquid is expelled. Furthermore, it is difficult with such construction to expel all of the liquid propellant from its tank.

One of the objects of the present invention is to provide an improved apparatus using a flexible diaphragm for delivering liquid propellant from a storage tank to the combustion chamber of a rocket engine which expands without stretching and reduces the possibility of liquid leakage during storage.

Another object is to provide an improved apparatus of the type indicated for positively expelling liquid from a tank which has a high liquid expulsion efficiency and reduces any axial shift of the center of gravity to a minimum.

Still another object of the present invention is to provide a liquid expelling apparatus of the type indicated which is of simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 4:
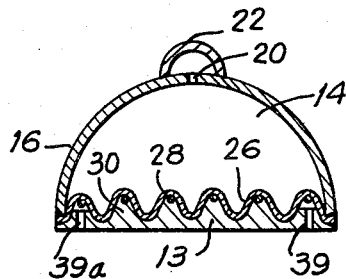

FIGURE 4 is a transverse sectional view of the upper half of the annular tank showing the ports in the septum plate for delivering a motive fluid to the inner and outer peripheries of the diaphragms and the circular wire rings for resisting lateral deformation of the diaphragm; and FIGURES 5 to 10 are views similar to FIGURE 4 showing the progressive expansion of the diaphragm from the outer and inner peripheries inwardly toward the center as controlled by the wire rings until the diaphragm contacts the entire surface of the curved wall of the tank.

The present invention is shown applied to a tank 12 having an annular convex casing adapted for location, for example, coaxially in a rocket engine. While the tank 12 may have other shapes and have a single liquid storing chamber, it is illustrated in the drawings in the form of a torus, see FIGURE 2, with an annular plate 13 located medially thereof to separate the torus into a pair of liquid storage chambers 14 and 15. Thus, the storage chambers 14 and 15 of the torus shaped tank 12 have the same volume to contain equal amounts of the bi-propellant liquids.

The torus shaped tank 12 comprises a pair of annular shells 16 and 17 of semi-circular shape in cross section and connected at their inner and outer peripheries by circular bands or rings 18 and 19. The annular septum plate 13 extends between the inner and outer rings 18 and 19 in a medial plane of the torus shaped tank to form the separate chambers 14 and 15. Chamber 14 has outlet ports 20 and chamber 15 has outlet ports 21 and the ports are connected to circular headers 22 and 23, respectively, in the form of circular troughs welded to the periphery of the casing shells 16 and 17. It will be understood that the headers 22 and 23 would be connected to the combustion chamber of a rocket engine by conduit means, not shown.

Figure 10:
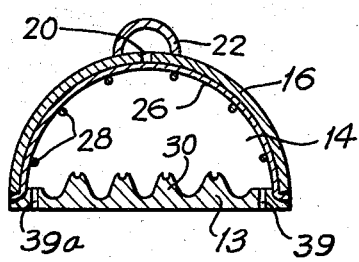

In accordance with the present invention, diaphragms 26 and 27 are provided at opposite sides of the annular septum plate 12 which are expanded by a pressurizing gas from a gas generator to expel the liquids from the separate chambers 14 and 15 through the outlet headers 22 and 23, respectively, to a consuming device such as the combustion chamber of a rocket engine. The diaphragms 26 and 27 of an impermeable non-stretching material, such as a metal, are initially folded and have a sufficient width transversely of the torus to expand outwardly into contacting engagement with the semicircular wall of its respective shell half 16 and 17, as shown in FIGURE 10, and the arrangement is such that the pressure of the gas is equalized at the opposite sides of the annular septum plate. In addition, reinforcing rings 28 are provided in the walls of the diaphragms 26 and 27 to resist lateral displacement and thereby control the expansion of the diaphragms in a regular manner from the inner and outer peripheries toward the center as shown in FIGURES 4 to 10.

More specifically, the annular septum plate 13 has circular corrugations 30 and 31 at its opposite sides which are concentric with the axis of the torus shaped tank 12. The combined length of the undulations of the corrugation 30 and/or 31 are so designed as to equal the circumference of the semi-circular shell halves 16 and 17, respectively. The folds in the diaphragms 26 and 27 are in the form of corrugations having the same contour as the corrugations in the septum plate so that when they expand they will contact the entire inner periphery of the shell halves as shown in FIGURE 10.

The gas generator may be located exteriorly of the torus shaped tank 12, but in the illustrated embodiment it comprises strands 32 and 32a of solid propellant with each wound in a helix in a chamber 33 and 33a formed in the annular septum plate 13. A series of internal and external igniters 34 and 35 project radially from the inner and outer peripheries of the tank 12 and are so located as to initially ignite the solid propellant strands 32 and 32a. To this end, the chambers 33 and 33a containing the solid propellant strands 32 and 32a have enlarged annular slots 36 and 36a at their opposite ends, respectively, to insure ignition of each strand at any of a number of points around its circumference as, for example, by the ignition of a black powder charge in the igniters 34 and 35. While not shown, it will be understood that the black powder charge would be ignited in a conventional manner by electrical igniting devices.

Ports 39, 39a and 40, 40a at the inner and outer periphery of the annular septum plate 13 extend from the annular slots 36 and 36a to the opposite sides of the plate, respectively, and pressure equalizing ducts 41 connect the slots so that pressure of the gas flowing through the ports 39, 39a and 40, 40a will be equal. Thus, gas produced by the solid propellant strands 32 and 32a is delivered equally between the opposite sides of the septum plate 13 and the diaphragms 26 and 27.

Figure 3:
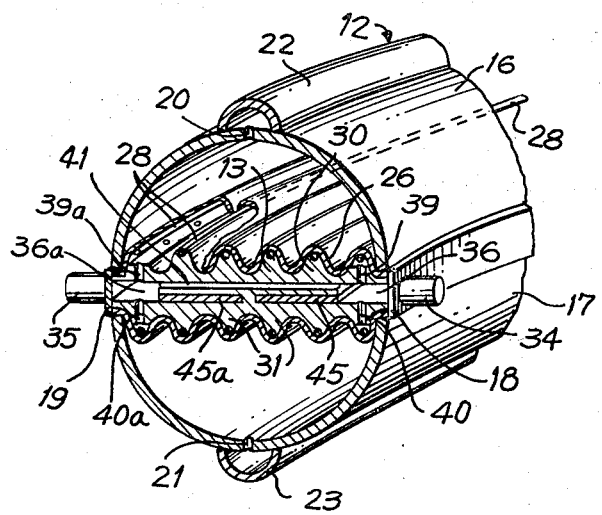
FIGURE 3 is a perspective view of a portion of the tank and showing the corrugated shape of the diaphragms and the circular wires attached to the corrugations to resist lateral shifting of the diaphragms during expansion.

FIGURE 3 also shows modified solid propellant grains 45 and 45a in form of annular rings. The inner and outer edges of the rings of solid propellant 45 and 45a are ignited by the igniters 34 and 35 and burn inwardly toward each other from the peripheral edges.

As shown most clearly in FIGURE 3, the circular wire rings 28 normally seat in recesses at the apex of the corrugations 30 and 31 in the annular septum plate 13 and the wires are attached to the diaphragms 26 and 27 at the apexes of the corresponding corrugations therein as by welding, brazing, soldering, or the like. As will be observed more clearly in FIGURE 3 the wire rings 28 may move with the diaphragms 26 and 27 outwardly away from the septum plate 13, but prevent lateral movement of any part of the diaphragms relative to any other part to control the expansion, unfolding of the corrugations, in a uniform manner as illustrated in FIGURES 4 to 10. One form of the invention now having been described in detail the mode of operation is next explained.

Figure 1:
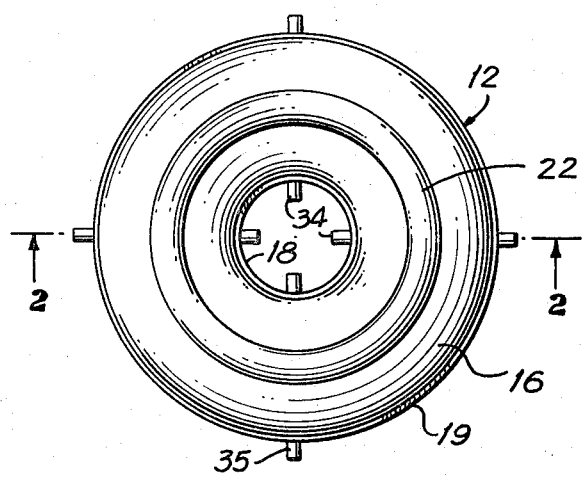
FIGURE 1 is a side elevational view of a torus shaped tank incorporating the novel features of the present invention.
Figure 2:
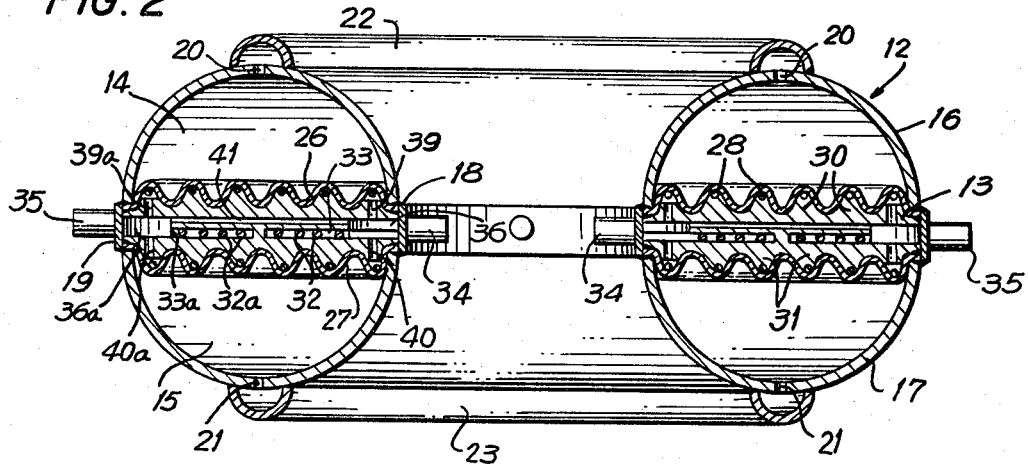
FIGURE 2 is a transverse sectional view taken on line 2—2 of FIGURE 1 and showing the annular septum plate dividing the torus shaped tank into separate chambers and the diaphragms for expelling separate liquid propellants from opposite sides thereof.
Figure 5:
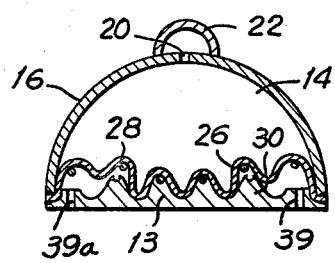
Figure 6:
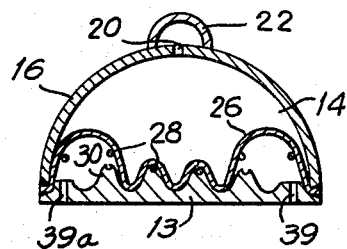
Figure 7:
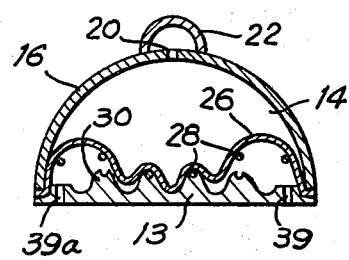
Figure 8:
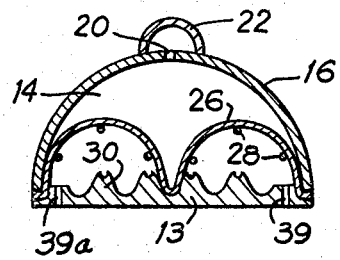
Figure 9:
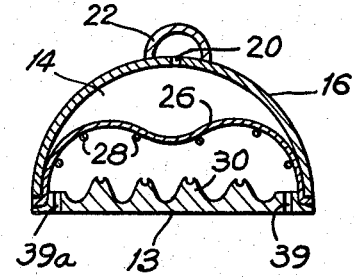

For purposes of description, let it be assumed that the diaphragms 26 and 27 are in the position illustrated in FIGURE 2 and that the chambers 14 and 15 are filled with liquid propellants. To initiate operation of the liquid expelling apparatus, the igniters 34 and 35 are operated to propagate a flame into the slots 36 and 36a at the inner and outed peripheries of the chambers 33 and 33a in the annular septum plate 13. The flame from the igniters 34 and 35 initiate burning of the solid propellant grains 32 and 32a of the strand type illustrated in FIGURE 2, or the plate type 45 and 45a illustrated in FIGURE 3. The burning of the solid propellant grain produces a gas in the chambers 33 and 33a which is equilized by the conduits 41 and flows to opposite sides of the septum plate 13 through the ports 39, 39a and 40, 40a at the inner and outer peripheries of diaphragms 26 and 27. As the gas initially flows through the ports 39, 39a and 40, 40a it initially expands the diaphragms 26 and 27. Such initial expansion of the diaphragm 26 is illustrated in FIGURE 5, but it will be understood that diaphragm 27 will expand in the same way. Therefore, the following description with respect to diaphragm 26 is intended to apply to the diaphragm 27. The expansion of diaphragm 26 continues in the manner illustrated in FIGURES 6 through 9 until it contacts the entire area of the semi-circular wall of the casing sections 16 as shown in FIGURE 10. As the diaphragm 26 expands it displaces the liquid in the chamber 14 through the ports 20 and header 22 from which it is delivered to the combustion chamber of a rocket engine. If the separate bipropellant liquids are expelled from chambers 14 and 15 at the same rate from opposite sides of the septum plate 13 the center of gravity will remain in the medial plane of the septum plate and maintain the center of gravity of the rocket engine substantially constant when the torus shaped tank is mounted coaxially with the engine.

It will now be observed that the present invention provides an improved expelling apparatus having a diaphragm for delivering bi-propellants to the combustion chamber of a rocket engine which will expand without stretching and is impermeable to the liquid being stored. It will also be observed that the present invention provides an apparatus of the type indicated having a high expulsion efficiency and one which reduces any axial shift in its center of gravity to a minimum. It will still further be observed that the present invention provides an improved liquid expelling apparatus which is of simple and compact construction adapted for economical manufacture and one which is reliable in performing its intended function.

While a single embodiment of the invention and two forms of gas generator are herein illustrated and described, it will be understood that further changes may be made in the construction and arrangement and elements without departing from the spirit and scope of the invention. Therefore, without limitation in this respect, the invention is defined by the following claims.

In the claims:

1. Apparatus for positively expelling a propellant liquid from an annular tank in a rocket engine, said tank having an annular convex casing with a circular opening at its axis and an outlet port at the apex of its convexity, a diaphragm of impermeable material in the form of an annular disc extending across the tank at the base of its convexity with its edges sealed thereto, said annular diaphragm being spaced from the annular convex wall of the tank to provide a storage space therebetween and having concentric corrugations between its inner and outer periphery to provide a total surface area equal to the surface area of the convex wall of the casing, means cooperating with the side of the diaphragm opposite the storage space to provide a closed expansion chamber, and a gas generator for delivering gas to the chamber to expand the corrugated diaphram into engagement with the convex wall of the tank to expel liquid therefrom into the outlet port.

2. Apparatus in accordance with claim 1 in which circular wires are attached to the corrugations to resist lateral deformation of the corrugations during expansion of the diaphragm.

3. Apparatus for expelling bi-propellant liquids from a tank in a rocket engine, said tank being in the form of a torus, a pair of annular diaphragms arranged in back-to-back relationship medially of the torus with their edges sealed to the tank walls to provide separate storage chambers for the bi-propellants at opposite sides and a closed expansion chamber therebetween, said diaphragms being constructed to expand outwardly into contacting engagement with convex walls of the torus shaped tank, and a gas generator for delivering gas to the closed expansion chamber to simultaneously expand the diaphragms and expel the bi-propellant liquids from the tank.

4. Apparatus in accordance with claim 3 in which the gas generator is a solid propellant grain located in the space between the diaphragms, and an igniter for initiating burning of the solid propellant grain.

5. Apparatus in accordance with claim 4 in which an annular plate is provided between the diaphragms and having circular corrugations on opposite sides, the diaphragms having corresponding corrugations snugly fitting the corrugations in the plate, a recess in the plate having ports extending to the opposite sides thereof, and said solid propellant being located in said recess adjacent said igniter.

6. Apparatus in accordance with claim 5 in which the recess in the plate is annular, and the solid propellant grain is in the form of a spiral strand in the annular recess in the plate.

7. Apparatus in accordance with claim 5 in which the recess in the plate is annular, the solid propellant grain is in the form of annular disc in said recess, and the igniter is located at the outer edge of the disc.

8. Apparatus in accordance with claim 5 in which circular wires are attached to successive corrugations in the diaphragms to resist lateral deformation of the diaphragms during expansion.

9. Apparatus in accordance with claim 8 in which the ports in the annular plate are located adjacent the inner and outer peripheries to control the expansion of the annular diaphragms from the opposite edges inwardly toward the center, and means connecting the ports to equalize the pressure at the inner and outer edges.

References Cited

UNITED STATES PATENTS

| 356,997 | 2/1887 | Gil | 92—104 |
| 1,790,206 | 1/1931 | Farmer | 92—104 |
| 3,229,014 | 1/1966 | Petriello | 222—95 X |
| 3,275,193 | 9/1966 | Barr | 222—386.5 |

ROBERT B. REEVES, *Primary Examiner.*

HADD S. LANE, *Examiner.*